United States Patent [19]

Pickering

[11] Patent Number: 4,816,321

[45] Date of Patent: Mar. 28, 1989

[54] ANTICOUNTERFEIT METALLIZED LABELS

[75] Inventor: John H. Pickering, Concord, Mass.

[73] Assignee: Dennison Manufacturing Company, Framingham, Mass.

[21] Appl. No.: 535,096

[22] Filed: Sep. 23, 1983

Related U.S. Application Data

[62] Division of Ser. No. 317,222, Nov. 2, 1981.

[51] Int. Cl.[4] .......................... G01D 5/12; G09F 3/10; B32B 15/12

[52] U.S. Cl. .................................... 428/199; 428/201; 428/916; 428/209

[58] Field of Search ............... 428/209, 916, 199, 201, 428/138; 283/8 R, 8 B, 9 A, 9 R, 11, 12, 21

[56] References Cited

U.S. PATENT DOCUMENTS 4,166,144 8/1979 Amberkar ............................. 428/40

4,215,170 7/1980 Vilaprinyo ...................... 156/234 X 4,352,706 10/1982 Miller ................................ 427/7 X

*Primary Examiner*—Nancy A. B. Swisher

*Attorney, Agent, or Firm*—Arthur B. Moore

[57] ABSTRACT

An electrosensitive substrate from which a metallized surface layer is selectively removed using electrosensitive printing to expose a patterned underlayer. The patterned underlayer may be randomly exposed, or exposed in prescribed portions. Tags, labels or the like of this description may be electrically imprinted with unique identification codes, such as serially printed alphanumeric characters. Such tags and labels resist duplication by conventional printing techniques. The patterned underlayer may be imprinted using inks of a variety of surface textures, resulting in an embossed effect in the metallized surface. Alternatively, a lacquer layer may be provided between the patterned layer and the metallized surface to achieve a uniform appearance of the metallized surface.

14 Claims, 1 Drawing Sheet

ANTICOUNTERFEIT METALLIZED LABELS

This is a division of Ser. No. 317,222, filed Nov. 2, 1981.

BACKGROUND OF THE INVENTION

The present invention relates to the manufacture of tags and labels, and more particularly to the production of the tags and labels of a type which is difficult to counterfeit.

It is desirable in many commercial applications to employ tags or labels which are unique and which resist illicit duplication. It is well known in many industries that socalled "pirates" will simulate a product using inferior materials and production techniques, and will sell these products at a reduced price. In many cases, such duplicates violate the patent, trademark, or copyright laws as well as the law of unfair competition. Typically, the pirate wil mimic the packaging and labelling of goods in order to "pass off" his goods as the product of a well established enterprise. It is therefore desirable to provide tags and labels of a design which may not be easily duplicated, or which if duplicated may be easily detected as fraudulent.

Accordingly, it is a principal object of the invention to provide a method of manufacturing tags and labels of a sort which are difficult to duplicate. A related object is the provision of tags and labels of this type which incorporate unique product identification information. Another related object of the invention is the employment of a tag and label printing technique which is beyond the resources of typical "pirates".

A further object of the invention is the achievement of a pleasing appearance in such tags and labels. It is a related object to provide a versatile range of tag and label formats.

SUMMARY OF THE INVENTION

An electrosensitive substrate comprising a base layer, an intermediate layer, and a metallized surface layer, in which the layer bears a visibly nonuniform complex pattern which is selectively exposed by removal of the metallized surface layer. Typically, the intermediate layer comprises a multicolored layer imprinted over the base layer in a complex pattern. The electrosensitive substrate is particularly suited to production of tags, labels, and the like which have an attractive appearance and are difficult to reproduce.

In the preferred embodiment in which the electrosensitive substrate is produced in the form of tags and labels, these may be inscribed with unique identifying information, such as serially printed alphanumeric characters. Such tags and labels resist duplication due to the superimposition of such information over the pattern of the intermediate layer.

In accordance with one aspect of the invention, the patterned intermediate layer may be exposed during electrosensitive printing in a random manner, or alternatively may be exposed to provide a predetermined pattern within the inscribed indicia. The substrates are particularly difficult to duplicate in the first instance due to the haphazard nature of the exposed pattern. As an instance of a precalculated exposure of the sublayer, the technique of the invention may be used, for example, to contain a repeating logotype or the like within the inscribed message.

In accordance with another aspect of the invention, the user may easily distinguish tags or labels produced in accordance with the invention from inexpensive imitations. One method of detecting imitations involves applying an electrically actuated stylus to a noninscribed area of the surface, which should result in additional exposure of the intermediate layer.

In accordance with yet another aspect of the invention, the base layer may comprise paper as in the preferred embodiment, or any other suitable medium to support the patterned layer. Optionally, the substrate of the invention further includes a lacquer layer between the patterned layer and the metallized surface.

In accordance with a given embodiment of the invention, the patterned layer may be imprinted using a multiplicity of inks having various surface textures. After metallization, this results in a ghost of the printed image in accordance with gloss differentials of the colored layer. This might be used to create an embossed effect in the metallized substrate. Alternatively, in the embodiment in which a lacquer layer is superimposed between the colored layer and the metallized surface, any gloss differentials would not induce visible variations in the metallized surface.

BRIEF DESCRIPTION OF THE DRAWINGS

The above and additional aspects of the invention are further illustrated with reference to the detailed description which follows, taken in conjunction with the drawings in which.

DETAILED DESCRIPTION

Figure 1:
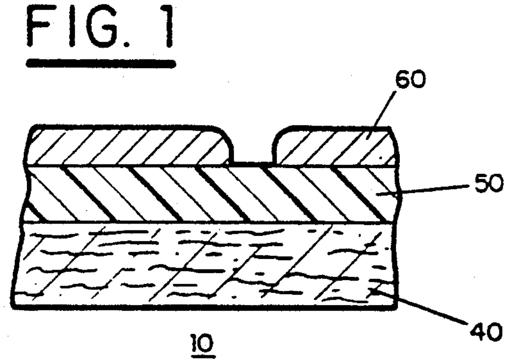
FIG. 1 is a sectional view of a metallized substrate in accordance with a preferred embodiment.

Reference should not be had to FIGS. 1-4 for a detailed description of electrosensitive metallized substrates in accordance with the preferred embodiment. The sectional view of FIG. 1 depicts a three-layer metallized substrate 10. Electrosensitive substrate 10 includes a base layer 40, illustratively paper; a patterned intermediate layer 50, such as a pigmented resin layer; and a metallic surface layer 60, illustratively vacuum-deposited aluminum. The metallized surface layer 60 is selectively removed at 12 using any well known electrosensitive printing technique to expose the patterned intermediate layer 50.

Figure 3:
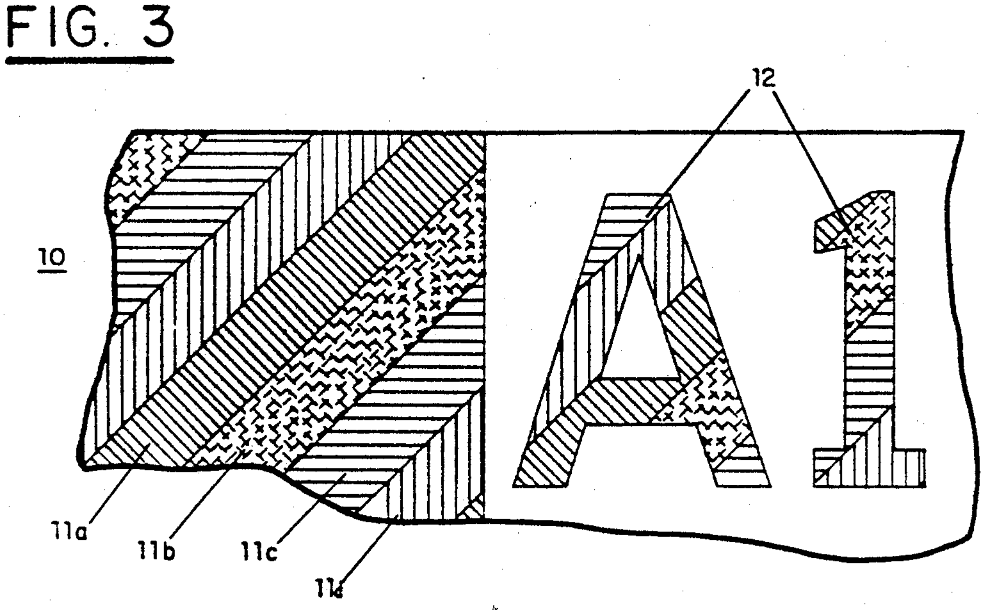
FIG. 3 is a partial plan view of an illustrative imprinted metallized substrate with the metallized surface partially removed.

As shown in the plan view of FIG. 3, the layer 50 is imprinted in a complex patten, as opposed to the uniformly colored layer typically found in prior art electrosensitive substrates. In the illustrated embodiment, the colored layer 50 comprises a series of diagonal colored stripes 11*a*–11*d* in a repeating pattern of green - orange - blue - red. The pattern of layer 50 may include variations in hue (as shown), chromatic intensity, gloss, etc. After metallization, this complex pattern is partially exposed at 12 upon removal of the metallized surface 60.

In one embodiment of the invention, the indicia 12 are inscribed in random portions of the underlying patterned layer 50. For example, in the embodiment of FIG. 3, the indicia might encompass any possible sequence of colored diagonal stripes 11. This technique is advantageously employed in the manufacture of tags, labels, or the like. In such an application, the indicia 12 might comprise unique identifying information, such as serial numeration of tickets. It is a principal advantage of the invention that tags and labels of such manufacture would not be easily reproducible, in that conventional serial printing apparatus provides monochromatic alphanumeric characters. This would be particularly true in the embodiment in which the patterned underlayer is randomly exposed during electrosensitive printing, thereby providing a variety of patterns superimposed over the inscribed information.

Figure 2:
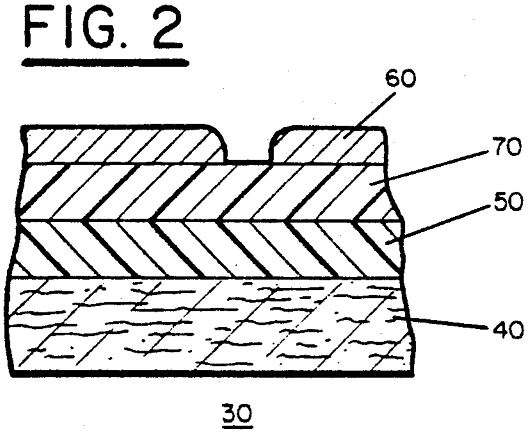
FIG. 2 is a sectional view of a metallized substrate in accordance with an alternative embodiment.
Figure 4:
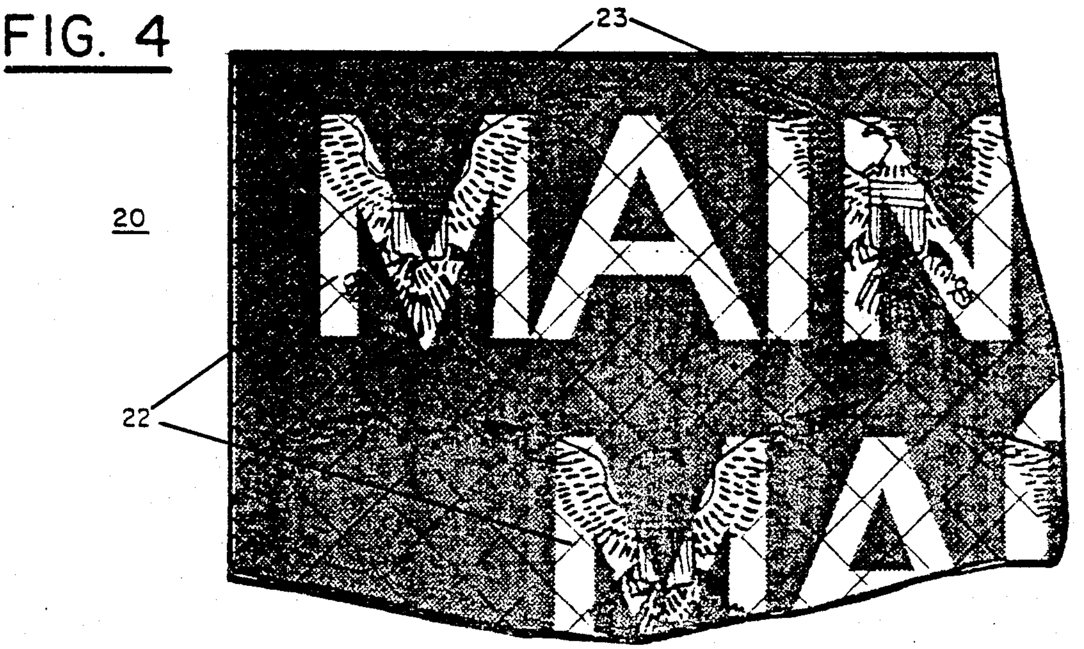
FIG. 4 is a partial plan view of a metallized substrate in accordance with a further embodiment of the invention.

In an alternative embodiment of the invention shown in FIG. 4, the patterned layer 50 is imprinted using a variety of printing inks providing different surface textures, i.e. gloss. After metallization, this will result in ghosts of the printed image in that the metallized surface will appear lighter in areas of greater gloss of layer 50. This may be used to create an embossed effect in the metallized surface, as shown in FIG. 4. If such an effect is not desired, an alternative substrate 30 may include an additional lacquer layer 70 as a buffer between colored layer 50 and metallized layer 60 (FIG. 2). Lacquer layer 70 ensures a uniform appearance of the metallized layer despite any nonuniformities in layer 50. An additional patterned layer (not shown) may be inserted between lacquer layer 70 and metallized layer 60 to superimpose an additional pattern (such as logotypes as discussed below) over the pattern of layer 50.

As illustrated in the plan view of FIG. 4, layer 50 is printed in repeating pattern of logotypes, which may be employed in tags, labels, etc. to identify the source. This pattern may be registered with the inscribed message during the electrosensitive printing process. In the embodiment in which the pattern of layer 50 is reflected in ghost images in the metallized surface 60, such logotypes provide a watermark effect.

In the preferred embodiment, base layer 40 comprises paper, which acts as a support for the colored intermediate layer 50. Any suitable paper known in the metallizing art may be employed for its compatibility with the materials and coating technique of layer 50. In broadest terms the base layer 40 may be any suitable material to provide a support for the other layers of metallized substrate 10. For example, base layer 40 may comprise a nonwoven fabric.

Colored layer 50 illustratively includes a plurality of formulations, each consisting of a binder material and a pigment. Suitable pigments and binder materials are well known in the art of electrosensitive papers. Where it is desired to achieve a variety of surface textures layer 50 may incorporate pigments of different granularities. In general, pigments which are well ground and well dispersed in the binder will provide a greater surface gloss. It is furthermore advisable in the areas of greater gloss to employ a vehicle which will not unduly penetrate the base layer 40. Layer 50 may also incorporate matting agents, plasticizers, or other additives well known in the art.

Metallized layer 60 advantageously comprises a vacuum-deposited aluminum layer of a thickness suitable for electrosensitive printing. Illustratively, layer 60 has a resistivity in the range from about 1 to 8 ohms. Alternatively, layer 60 may comprise any vacuum-deposited metal compatible with electrosensitive printing. Additional layers not illustrated may be included, such as an overcoat for fingerprint protection.

The invention is further illustrated in the following examples:

EXAMPLE 1

A 40 pound (24"×36" basis area), size coated paper was printed with a pattern of adjacent colored diagonal stripes. The pattern consisted of a series of 0.082 inch stripes in the repeating sequence violet, red, green, orange, blue, and yellow. The stripes were imprinted using a rotary flexographic press with conventional flexoinks. The striped paper was vacuum metallized with a thin aluminum film having a resistivity of 2.5 ohms per square. The metallized paper was slit into 3 inch wide rolls, and inscribed with sequential ¼ inch serial numbers using an Axion Corp. (Glendale, CA) EX-850 electrosensitive printer.

EXAMPLE 2

The metallized paper of Example 1 was coated on the side opposite the metallized film with a pressure sensitive adhesive The adhesive coated paper was then laminated to a silicone coated release sheet and die cut to form 2"×2" labels.

EXAMPLE 3

Metallized paper was produced in accordance with Example 1, with the additional step prior to metallization of coating the substrate with a clear flat acrylic lacquer at a coating weight of 2 pounds/ream. Whereas the metallized substrates of Examples 1 and 2 evidenced a striped pattern in the finished surface, the substrate of Example 3 achieved a uniform surface appearance.

EXAMPLE 4

Metallized paper was produced as in Example 3, with the further step of imprinting an additional patterned layer over the lacquer layer. The additional patterned layer consisted of a repeating series of logotypes, which appeared as ghost images of the metallized surface.

EXAMPLE 5

A base layer of 0.005 inch thick, spun bond polyester film was coated and metallized using the techniques of Example 3. The coated, metallized film was serially imprinted as in Example 1 and die cut into labels for use with fabric goods and the like.

While various aspects of the invention have been set forth by the drawings and the specification, it is to be understood that the foregoing detailed description is for illustration only and that various changes in parts as well as the substitution of equivalent constituents for those shown and described, may be made without departing from the spirit and scope of the invention as set forth in the appended claims.

I claim:

1. A metallized substrate for electrosensitive printing in a pattern of indicia comprising:

a base paper layer;

a decorative background layer deposited over said base paper layer, comprising a plurality of mixtures each including a film-forming resin and a colorant additive, said decorative background layer being imprinted in a multiplicity of discrete areas each of uniform appearance, forming a visibly heterogeneous pattern;

an opaque vapor-deposited metallic surface layer of a thickness permitting selective removal by means of an electrical signal to selectively expose the decorative background layer, wherein the discrete areas are sufficiently large to be visibly distinguishable, but narrower along at least one axis than the extent of said indicia along that axis.

2. A metallized substrate as defined in claim 1 wherein portions of the metallic surface layer are electrically removed in a plurality of informational indicia, to expose a plurality of the discrete areas within the boundaries of each of said indicia.

3. A metallized substrate as defined in claim 1 wherein the colorant additives are selected from the class consisting of pigments and dyes, and the metallic surface layer comprises vapor-deposited aluminum having a surface resistivity of between 1 and 8 ohms per square.

4. A metallized substrate as defined in claim 1 wherein the decorative background layer forms a multi-colored pattern comprised of a plurality of discrete monochrome layers.

5. A metallized substrate as defined in claim 1 wherein the decorative background layer has a surface texture causing its pattern to be simulated by ghost images in the metallic surface layer.

6. A metallized substrate as claimed in claim 1 wherein the metallic surface layer has a uniform appearance.

7. A metallized substrate for electrosensitive printing in a patttern of indicia comprising:

a base paper layer;

a decorative background layer deposited over said base paper layer, comprising a plurality of mixtures each including a film-forming resin and colorant additive, said decorative background layer being imprinted in a multiplicity of discrete areas each of uniform appearance, forming a visibly heterogeneous pattern characterized by variations in surface texture;

an opaque vapor-deposited metallic surface layer of a thickness permitting selective removal by means of an electrical signal to selectively expose the decorative background layer within said indicia, wherein the discrete areas are sufficiently large to be visibly distinguishable, but narrower along at least one axis than the extent of said indicia along that axis, and wherein the visibly heterogeneous pattern of said decorative background layer is simulated by ghost images in the metallic surface layer.

8. A metallized substrate as defined in claim 7 wherein portions of the metallic surface layer are electrically removed in a plurality of informational indicia, to expose a plurality of the discrete areas within the boundaries of said indicia.

9. A metallized substrate as defined in claim 7 wherein the decorative background layer forms a multi-colored pattern comprised of a plurality of discrete monochrome areas.

10. A metallized substrate as defined in claim 7 wherein the colorant additives are selected from the class consisting of pigments and dyes, and the metallic surface layer comprises vapor-deposited aluminum having a surface resistivity of between 1 and 8 ohms per square.

11. A metallized substrate as defined in claim 7 wherein the plurality of discrete area have a variety of glosses.

12. A metallized substrate as defined in claim 7 for use as a tag, label, or the like wherein the plurality of indicia comprise identification codes.

13. A metallized substrate as defined in claim 7 wherein the decorative background layer has a surface texture causing its visibility heterogeneous pattern to be simulated by ghost images in the metallic surface layer.

14. A metallized substrate as defined in claim 7, for use as a tag, label, or the like, wherein the plurality of indicia comprise identification codes.

* * * * *